(12) United States Patent
Deinhard et al.

(10) Patent No.: US 8,745,259 B2
(45) Date of Patent: Jun. 3, 2014

(54) INTERACTIVE MEDIA STREAMING

(75) Inventors: Jan Deinhard, Hamburg (DE); Tobias Lensing, Bremen (DE); Paul Kellett, Bremen (DE)

(73) Assignee: Ujam Inc., Dover, DE (US)

( * ) Notice: Subject to any disclaimer, the term of this patent is extended or adjusted under 35 U.S.C. 154(b) by 119 days.

(21) Appl. No.: 13/565,536

(22) Filed: Aug. 2, 2012

(65) Prior Publication Data

US 2014/0040494 A1 Feb. 6, 2014

(51) Int. Cl.
*G06F 15/16* (2006.01)
(52) U.S. Cl.
USPC ............................... 709/231; 709/217
(58) Field of Classification Search
USPC ............ 709/200–203, 217–227, 231
See application file for complete search history.

(56) References Cited

U.S. PATENT DOCUMENTS

| 5,359,712 | A | 10/1994 | Cohen et al. |
| 6,081,263 | A | 6/2000 | LeGall et al. |
| 6,154,600 | A | 11/2000 | Newman et al. |
| 6,337,947 | B1 | 1/2002 | Porter et al. |
| 7,042,583 | B1 | 5/2006 | Wilkins et al. |
| 7,432,940 | B2 | 10/2008 | Brook et al. |
| 7,555,768 | B2 | 6/2009 | Norman |
| 7,657,155 | B2 | 2/2010 | Korehisa et al. |
| 7,716,572 | B2 | 5/2010 | Beauregard et al. |
| 7,743,021 | B2 * | 6/2010 | Boggs ........................... 707/610 |
| 7,895,610 | B1 | 2/2011 | Dasgupta |
| 7,921,217 | B2 * | 4/2011 | Yan et al. ...................... 709/229 |
| 8,375,140 | B2 * | 2/2013 | Tippin et al. .................. 709/236 |
| 8,600,220 | B2 * | 12/2013 | Bloch et al. .................... 386/296 |
| 2004/0148134 | A1 | 7/2004 | Klausberger et al. |
| 2007/0067812 | A1 | 3/2007 | Watanabe |
| 2007/0283035 | A1 | 12/2007 | Wang |
| 2007/0288484 | A1 * | 12/2007 | Yan et al. ........................ 707/10 |

(Continued)

FOREIGN PATENT DOCUMENTS

| EP | 2051173 A3 | 8/2009 |
| EP | 1421792 B1 | 11/2011 |

(Continued)

OTHER PUBLICATIONS

Jorda S., "Faust Music On Line: An Approach to Real-Time Collective Composition on the Internet," Leonardo Music Journal, vol. 9, 1999, pp. 5-12.

(Continued)

*Primary Examiner* — Moustafa M Meky
(74) *Attorney, Agent, or Firm* — Haynes Beffel & Wolfeld LLP

(57) ABSTRACT

A live rendering system can execute a process of buffering received data at the client to avoid needing to transfer the same data multiple times. If the client does not have data available for a wanted playback position (either compressed or decoded) then this data needs to be transferred from the server, including any overlaps needed for producing a continuous stream. The client stores the data in the event that it is needed again, but can discard the data if it receives notice that the stream content has changed. The buffering process can operate with a first priority to buffer data ahead of a currently selected playback position which is the most likely to be needed next, to minimize any delay or pauses in playback if needed data has not yet arrived. The download can be managed to preserve the known good part of decoded data.

60 Claims, 12 Drawing Sheets

(56) References Cited

U.S. PATENT DOCUMENTS

| | | | |
|---|---|---|---|
| 2009/0094516 A1 | 4/2009 | Rich | |
| 2010/0080384 A1 | 4/2010 | Lee | |
| 2013/0259442 A1* | 10/2013 | Bloch et al. | 386/230 |

FOREIGN PATENT DOCUMENTS

| | | |
|---|---|---|
| GB | 2343049 B | 4/2003 |
| JP | 2003058172 A | 2/2003 |
| JP | 2007121976 A | 5/2007 |
| KR | 10-2007-0020727 A | 2/2007 |
| KR | 1020100115988 A1 | 3/2007 |
| KR | 10-2010-0115987 A | 10/2010 |
| WO | 9806098 A1 | 2/1998 |
| WO | 0135056 A1 | 5/2001 |
| WO | 0163911 A3 | 2/2002 |
| WO | 2004090898 A1 | 10/2004 |
| WO | 2007072467 A1 | 6/2007 |
| WO | 2003094413 A3 | 7/2007 |

OTHER PUBLICATIONS

Atkinson T., "Jazz It Up, with Music Technology!," Educational Resources Information Center, Oct. 2004, Assoc. Educational Communications and Technology, Washington, DC., pp. 10-16.

Bellini P., et al., "WEDELMUSIC Format: an XML Music Notation Format for Emerging Applications," Proc. 1st Int'l Conf. on Web Delivering of Music, Nov. 2001, 8 pp.

Barbosa A., "Displaced soundscapes: A survey of network systems for music and sonic art creation," Leonardo Music Journal, vol. 13, 2003, pp. 53-59.

Alvaro J. et al., "Computer Music Cloud," Lecture Notes in Computer Science, (S. Ystad ed.)vol. 6684, 2011, pp. 163-175.

Vanegas R., "Linking Music Students and Music Instructors via the Internet," Leonardo Music Journal vol. 38.1, 2005, pp. 1-10.

Savage J., "Music and ICT," KS2 Music CPD, The Open University, 2007, 10pp.

Lukasiewicz Paul, "Creating Web-Based Media and Incorporating Technology in the Music Classroom," M.A. thesis, Marywood University, 2007, 89pp.

Draper P., "Music, Technology and Classroom 2.0," Education Technology Solutions, 2008, pp. 1-4.

Kratus J., "Music Education at the Tipping Point," MENC Centennial Series, Music Educators Journal, 2007, pp. 42-48.

Mosterd E.J., "Developing a new way to transfer sheet music via the internet," M.A. thesis, 1999, The University of South Dakota, 145 pp.

Ariza C., An Open Design for Computer-Aided Algorithmic Music Composition: athenaCL, (Sep. 2005) (Ph.D. dissertation, New York University) 442 pages.

International Search Report and Written Opinion from PCT/US2013/053013 dated Nov. 19, 2013, 11 pages.

* cited by examiner

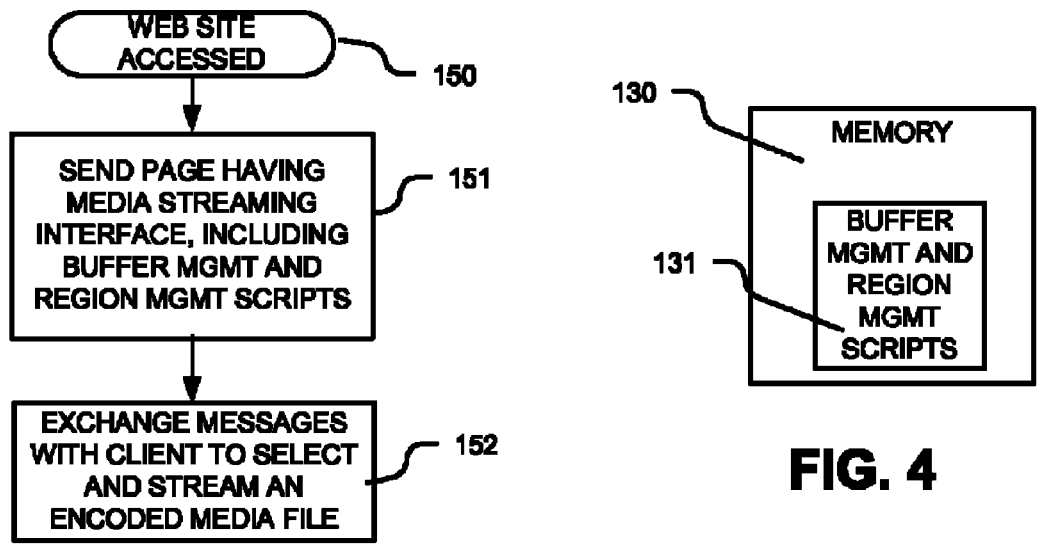
FIG. 3
FIG. 4
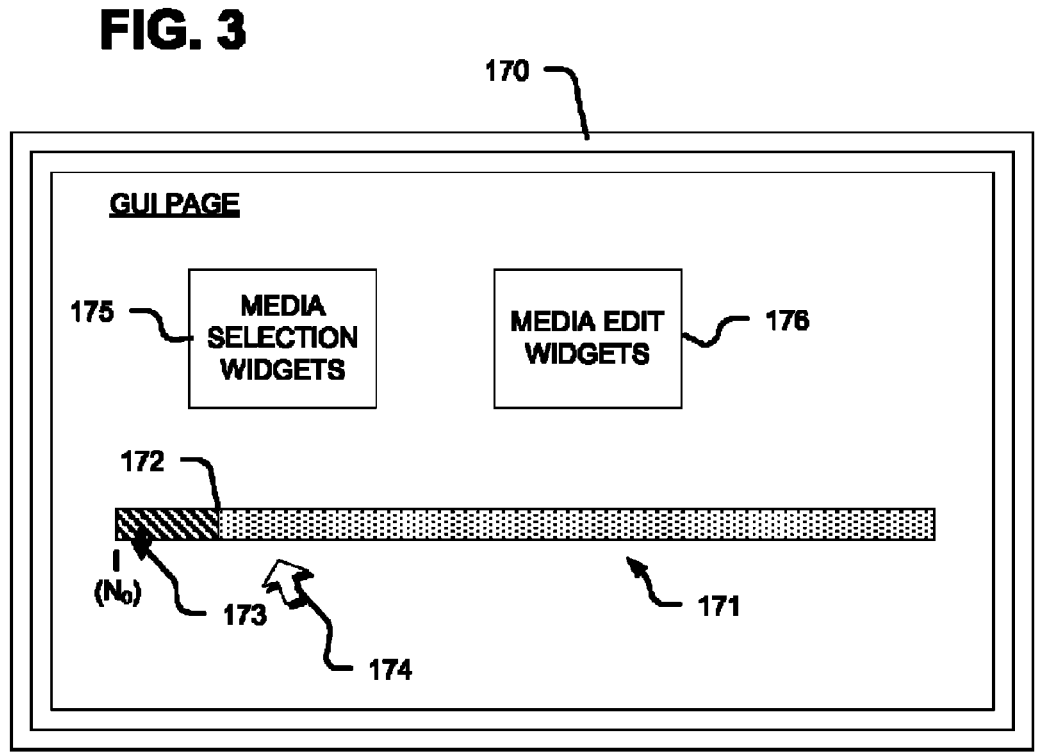
FIG. 5

INTERACTIVE MEDIA STREAMING

BACKGROUND

1. Field of the Invention

The present invention relates to technology for computer-based streaming of media data which can be used in a live-rendering destination.

2. Description of Related Art

One use of networks like the Internet involves delivering media data, such as audio and video, from a server to a client, where the client can render the data for playback, including live rendering as the data is streamed. In some settings, the client and server are configured to send an encoded media stream from the server to the client with transport controls (play, pause, position, etc.) so the user can play any part of the stream with minimal delay.

The stream may be pre-existing (e.g. a file on disk), generated in real-time (e.g. video from a live event), or generated as needed (e.g. the stream contents are generated based on user interaction, and parts of the stream may never be generated if the client does not request them). Normally the data will be encoded (e.g. MP3 for audio, H.264 for video) to reduce the total amount of data that needs to be transferred, with a corresponding decoding required for playback.

One possible approach would be to send data for the whole stream in advance to the client. Playback is then handled completely by the client so can be very responsive, but there is a long initial delay (latency) while the whole stream is sent, and another long delay if the stream contents change and need to be sent again.

Another possible approach is to send data only when needed for playback. If the transport position changes, the server can send stream data starting at that position to the client, sending more as needed as the playback position advances. This is how video streaming on the web commonly works. Storage requirements on the client side are minimized, but there is a short buffering delay before playback can start at a new position, and potentially the same data is sent multiple times if the user wants to play part of the stream repeatedly.

A web browser may have limited facilities for handling and decoding compressed stream data, for example a decoder may only be able to decode a complete media stream rather than the parts of a stream that have arrived at the client so far. The decoder may also corrupt the start or end of the stream, add or remove part of the length, and apply a time offset and/or time scaling to the decoded data.

In interactive environments, situations occur where parts of the stream are likely to be repeated, and where the contents of the stream may change. Treating the limited facilities for decoding compressed stream data on the client side as a "black box" as can be a practical requirement for Internet based streaming systems, may introduce a variety of unwanted effects.

Taking the example of MP3 encoded audio, nominally 1152 uncompressed audio signal samples are compressed to 1 encoded frame of MP3 data. Encoded frames of MP3 data are sent to the client and decoded back to audio data. However, individual frames cannot be decoded successfully without the context of the surrounding frames.

Consider an audio stream, where the first 11520 audio samples are compressed to 10 MP3 frames which are transferred to the client and passed to the black-box MP3 decoder. The decoder outputs 11600 samples of audio data instead of the expected 11520. What has happened? Typically the start of the audio data will be silent (as there was no previous input context for the decoder, and some internal buffering needs to take place before output can be produced), there may be a short fade-in at the start of the data, a short fade-out at the end, maybe followed by some more silence. Perhaps because of the wanted 11520 samples of audio, only samples 1000 to 10000 have been decoded correctly and are available from frame 1152 onwards in the decoded data. The exact lengths of fades and silences will depend on the implementation of the decoder, and may also produce different results for the same audio data compressed by different encoders. While the resulting decoded data may have an offset in time relative to the original (usually negligible for the purposes of playback positioning), for any reasonable decoder this offset will be constant for a given input stream.

So a live streaming configuration may not be able to correctly account for variations in the decoding performance of the wide variety of decoders used in the network, when it treats the decoders as a "black-box."

It is desirable to provide an efficient and flexible scheme for streaming and buffering media data in an interactive environment.

SUMMARY

Technologies are described here for streaming media data in interactive environments, such as a live rendering environment, where a user can randomly select start points in a media data, and move around during playback.

Live rendering can be supported by a process in which the server sends (optionally overlapping) sections of stream data to the client, which can optionally pre-pend previously received stream data, and pass the stream data to the black-box decoder. The client can take the section or sections of decoded data known to be good, and merge them to form a continuous stream of decoded media data. The "good" section can be taken as the known worst-case minimum, the worst-case for the particular client web browser and operating system, or can be measured by decoding a known media stream (for example a continuous tone) and increasing the amount of overlap of blocks of encoded data while increasing the amount of decoded data discarded until properties of the decoded stream (e.g. amplitude envelope) match the known stream or match a wanted criteria (e.g. constant within a margin of error).

Also, a live rendering system can execute a process of buffering received data at the client to avoid needing to transfer the same data multiple times. If the client does not have data available for a wanted playback position (either compressed or decoded) then this data needs to be transferred from the server, including any overlaps needed for producing a continuous stream. The client stores the data in case it is needed again, but can discard the data if it receives notice that the stream content has changed. The buffering process can operate with a first priority to buffer data ahead of a currently selected playback position which is the most likely to be needed next, to minimize any delay or pauses in playback if needed data has not yet arrived. When a sufficient amount of data is buffered ahead of the playback position and the client has storage space available, additional stream data can be transferred from the server and buffered. This can happen in the background whether playback is running or not. The best parts of the stream to buffer are those most likely to be played: the start of the stream, any previous playback start positions, and the start of any marked region, such as a region that will be played continuously in a loop.

Management of buffered data can be implemented using a data structure such as a binary tree, where initially there is one node representing playback of the whole stream. In a binary tree example, selecting a new playback startpoint creates two child nodes of an existing node, splitting the parent node's playback range into the part before and the part after the new startpoint. Stream data is buffered for each node in turn, and when all the stream data for two child nodes has been collected they can be removed, and the buffered data associated with the parent node. An alternative data structure would be a linked list of startpoints where adjacent startpoints can be merged when all the stream data between those points has been buffered.

Other aspects of the technology described herein can be understood from review of the drawings, the detailed description and the claims which follow.

BRIEF DESCRIPTION OF THE DRAWINGS

FIG. 3 is a simplified flow diagram of processes executed on a server, which deliver a webpage with a media streaming interface along with resources needed for supporting streaming in an interactive environment.

FIG. 4 is a simplified diagram representing a memory storing computer programs supporting streaming in an interactive environment.

FIG. 5 is a simplified illustration of a graphic user interface including a play head which can be used to support streaming in an interactive environment.

DETAILED DESCRIPTION

Figure 1:
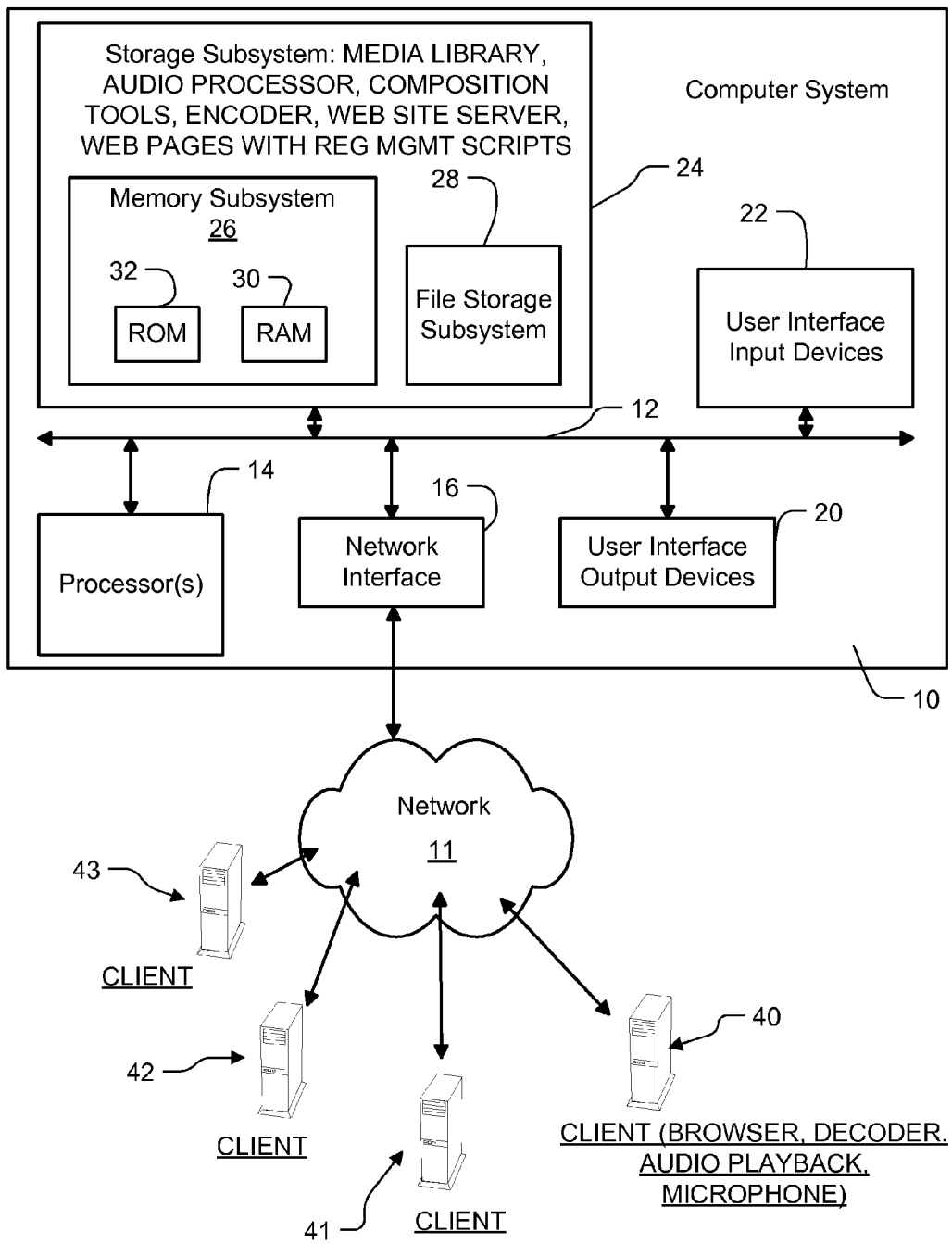
FIG. 1 is a simplified diagram of a data processing system implementing a media streaming system as described herein.

FIG. 1 illustrates a data processing system configured for streaming of encoded media data for live rendering. The system includes a computer system 10 configured as a server. Computer system 10 typically includes at least one processor 14 which communicates with a number of peripheral devices via bus subsystem 12. These peripheral devices may include a storage subsystem 24 comprising, for example, memory devices and a file storage subsystem, user interface input devices 22, user interface output devices 20, and a network interface subsystem 16. The input and output devices allow user interaction with computer system 10. Network interface subsystem 16 provides an interface to outside networks, and is coupled via communication network 11 to corresponding interface devices in other computer systems. Communication network 11 may comprise many interconnected computer systems and communication links. These communication links may be wireline links, optical links, wireless links, or any other mechanisms for communication of information. While in one embodiment, communication network 11 is the Internet, in other embodiments, communication network 11 may be any suitable computer network.

User interface input devices 22 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include possible types of devices and ways to input information into computer system 10 or onto communication network 11.

User interface output devices 20 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as via audio output devices. In general, use of the term "output device" is intended to include all possible types of devices and ways to output information from computer system 10 to the user or to another machine or computer system.

Storage subsystem 24 includes memory accessible by the processor 14 or processors, and by other servers arranged to cooperate with the system 10. The storage subsystem 24 stores programming and data constructs that provide the functionality of processes described with reference to FIG. 2, including server management modules, and other functions supporting streaming of media data such as an audio processor, a video processor, and an encoder, like an MP3 encoder and an H.264 encoder. In some embodiments, a media library including audio and video data which may be encoded in advance, may be included to act as a source of media data. Also, in some embodiments, the storage subsystem 24 stores web pages with scripts and other resources, and links to scripts and other resources, that can be delivered to clients via the network interface 16.

Storage subsystem 24 may also include other programs and data utilized in audio and/or visual media processing environments, such as automated music composition and editing technologies.

The software modules stored in the storage subsystem 24 are generally executed by processor 14 alone or in combination with other processors in the computer system 10 or distributed among other servers in a cloud-based system.

Memory used in the storage subsystem 24 can include a number of memories arranged in a memory subsystem 26, including a main random access memory (RAM) 30 for storage of instructions and data during program execution and a read only memory (ROM) 32 in which fixed instructions are stored. A file storage subsystem 28 can provide persistent storage for program and data files, and may include a hard disk drive, a floppy disk drive along with associated removable media, a CD-ROM drive, an optical drive, or removable media cartridges. The modules implementing the functionality of certain embodiments may be stored by a file storage subsystem in the storage subsystem 24, or in other machines accessible by the processor.

Bus subsystem 12 provides a mechanism for letting the various components and subsystems of computer system 10 communicate with each other as intended. Although bus subsystem 12 is shown schematically as a single bus, alternative embodiments of the bus subsystem may use multiple busses. Many other configurations of computer system 10 are possible having more or less components than the computer system depicted in FIG. 1.

The computer system 10 can comprise one of a plurality of servers, which are arranged for distributing the processing of data among available resources. The servers include memory for storage of data and software applications, and a processor for accessing data and executing applications to invoke its functionality.

The system in FIG. 1 shows a plurality of client computer systems 40-43 arranged for communication with the computer system 10 via network 11. The client computer system (e.g., 40) can be of varying types including a personal computer, a portable computer, a workstation, a computer terminal, a network computer, a television, a mainframe, a smartphone, a mobile device, a touch pad, or any other data processing system or computing device. Typically the client computer system 40-43 will include a browser or other application enabling interaction with the computer system 10, media decoders for decoding encoded media data, including encoded audio data for live rendering and playback, audio playback devices which produce sound from rendered audio data or compositions, and audio input devices such as a microphone which provide input audio data that can be utilized in the composition of music. In some embodiments, a client computer system 40-43 includes audio input devices such as a keyboard, other electronic audio input devices, audio synthesis sources, and the like, which can be applied to produce audio data used in the composition process.

In a client/server architecture, the computer system 10 provides an interface to a client via the network 11. The client executes a browser, and renders the interface on the local machine. For example, a client can render a graphical user interface in response to a webpage, programs linked to a webpage, and other known technologies, delivered by the computer system 10 to the client computer system 40. The graphical user interface provides a tool by which a user is able to receive information, and provide input using a variety of input devices. The input can be delivered to the computer system 10 in the form of commands, data files such as audio recordings, parameters for use in managing the streaming and buffering processes described herein, and the like, via messages or sequences of messages transmitted over the network 11.

Different protocols that can be used for communication with the servers include remote procedure call (RPC), streaming via Realtime Messaging Protocol (RTMP) with data encoded in AMF (Action Message Format), Websocket on a NodeJS Server, and Representational State Transfer (REST) via hypertext transfer protocol (HTTP) with data encoded as JavaScript Object Notation in Extensible Markup Language (JSON/XML).

Although the computing resources are described with reference to FIG. 1 as being implemented in a distributed, client/server architecture, the technologies described herein can also be implemented using locally installed software on a single data processing system including one or more processors, such as a system configured as a personal computer, as a workstation or as any other machine having sufficient data processing resources. In such system, the single data processing system can provide an interface on a local display device, and accept input using local input devices, via a bus system, like the bus subsystem 12, or other local communication technologies.

Figure 2:
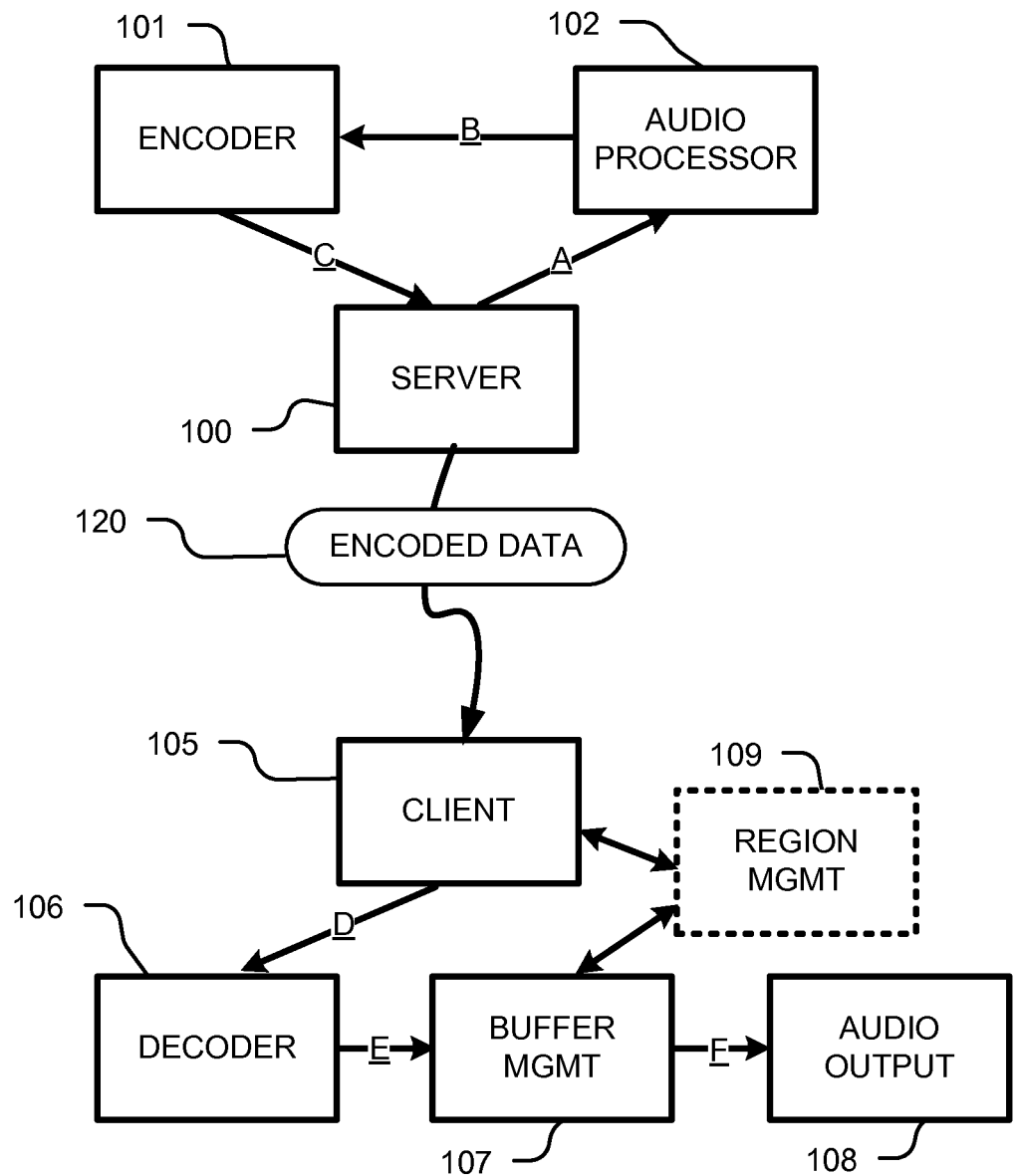
FIG. 2 is a simplified block diagram of server-side and client-side resources in a media streaming system.

FIG. 2 is a simplified illustration of components of a live rendering system. To support processes described here, the server side which acts a source of media data, can include a web server 100, an encoder 101 and an audio processor 102. The audio processor 102 can include programs for generation of audio data for supply to the encoder 101. Other sources of media data can be used as well, such as a database of pre-recorded audio or video. The web server 100 and encoder 101 provide logic for frame-wise rendering and encoding. The web server 100 can include indexing logic to support rendering from arbitrary start positions (in samples for example). The downloaded portions of the media data can be made frame discrete by client side resources. In one example, the media data is an audio file, and the encoder produces MP3 encoded audio frames.

The web server 100 can provide for packaging and streaming of the encoded data, which can be implemented using a protocol of flow control messages such as are supported by Websocket on a NodeJS Server for example. A "chunk" as the term is used herein, can comprise a set of encoded frames, or other units of encoding, having from one to many members depending on the media type, encoding technologies and a variety of design choices. For an MP3 embodiment, a "chunk" can consist of twelve frames, each from of which encodes, nominally, 1152 samples. Also, the web server 100 can include a flow control mechanism for marking or indexing the beginning/end of stream portions.

The client side resources shown in FIG. 2 include a client program 105 such as a web browser. The client side also includes a decoder 106, which is coupled to buffer management logic 107 and region management logic 109. The buffer management logic 107 can deliver decoded samples to the audio output 108 at the client for live rendering. The client program 105 includes resources for receiving encoded audio stream via a tool such as Websocket. The decoder can operate to decode chunks using a Web Audio API, for example.

A data flow can include encoded data (chunks) 120 received from web server 100. A current chunk may be attached to a previous chunk received in an intermediate buffer. That buffer is used for decoding. The client can support on-demand download regions (by play head position). In one approach to supporting on-demand download regions, a binary tree is used to intelligently buffer streamed audio when the user sets the play head.

In buffer management logic 107 and region management logic 109, region boundaries are adjusted if necessary to minimize glitches/cracks. For example, in MP3 audio the decoded portions of the audio data can be adjusted to frame discrete sizes. Flow management processes can establish stream start positions that enable overlapping of sections of the media data that are downloaded out of order. Region boundaries can be patched by crossfading overlapped sequences of samples from the previous regions.

FIG. 3 is a basic flowchart showing operation of the server-side system in an embodiment of the live rendering process described here. The process begins when a website is accessed (150). The server sends a page having a media streaming interface (see FIG. 5), along with buffer management and region management scripts to the client accessing the website (151). In an interactive session, the server exchanges messages with the client to select and stream encoded media data (152). Because the client may include a decoder, the logic in the web page sent to the client by the server may not include a decoder, but my include instructions that deliver the encoded data to the client's "black box" decoder, and manage the buffering and merging of the decoded data.

FIG. 4 illustrates another embodiment of technology for the live rendering process described here. In FIG. 4, a memory 130, which comprises a non-transitory data storage medium, for example, stores a computer program that includes buffer management and region management scripts 131, such as those which can be delivered from the server using the process of FIG. 3. The memory 130 can be part of a data storage system of a computer system, a portable memory device, a network attached storage, or other memory which can be read by a data processor and processed to execute the instructions stored therein.

FIG. 5 is a simplified diagram of a media streaming interface presented on a graphic user interface page 170. The media streaming interface can include a play head 173 on a timeline 171 with a starting position ($N_0$). The timeline 171 can show an advancing line 172 which illustrates to a user of the page 170 an amount of the media data which has been downloaded. The play head 173 can show the location of the last rendered media sample in the data. The page 170 can include logic that is responsive to the positioning of a cursor 174, for example, to select new starting positions along the timeline 171 as discussed above. This allows a user to move randomly around positions in a media data, for live rendering of the selected positions.

FIG. 5 illustrates that the play head may be included with other widgets on the page 170, such as media selection widgets 175, by which the client may select media data for downloading, and media editing widgets 176, by which a client may interactively edit media data. Play heads of this type can be used in a wide variety of web pages displayed on client devices. Also, play heads of this type can be used with other client programs that do not involve web interaction for example.

FIGS. 6 through 14 illustrate stages of region management in a server/client system relying on a data structure in the form of a binary tree for live rendering of audio data encoded using MP3, for example. Common elements of each figure include a client 200 such as a web browser with resources discussed with respect to FIG. 2 associated with it, and a server 201, also with resources discussed with respect to FIG. 2, associated with it. Also, each figure includes an illustration of a play head 210 which charts the portions of the audio data downloaded with random start positions being selected during the downloading. Also, each of the figures includes a representation of a decode buffer 211, for heuristic illustration of some aspects of the buffer management. A representation of the data structure is shown inside the client block 200 in each figure. Also, flow control messages between the server 201 and the client 200 are shown for each stage of the process.

In some embodiments, the live streaming process is driven by client commands, while server messages are sent to notify the client that a certain event occurred. For example, audio control commands and stream control commands can be issued by the client. Audio control commands can include:

PLAY/START_FRAME: sets the position in samples in the audio data to start streaming from PLAY/START: to instruct the server to start audio rendering—this just sets up the audio processor for audio generation, it doesn't start streaming actually PLAY/STOP: to stop audio rendering on the server—resets the audio processor internally.

Stream control commands can include:

STOP_STREAM: instructs the server to stop streaming even if not all audio data has been transmitted—this is used to abort streaming at a certain position when the download head moves, for instance START_STREAM/MP3: instructs the server to start pushing an MP3 encoded stream of audio data—this internally starts rendering audio from the previously set position and transmits the generated encoded chunks to the client.

The server can send flow control messages, including:

DONE: the server has transmitted the complete audio buffer (i.e., the end of the song was reached)

STOPPED: the server has stopped pushing chunks of encoded audio data (because it has previously been instructed to do so via 'STOP_STREAM')

These flow control messages account for the asynchronous nature of the streaming approach. For instance, once the server has started pushing packages of data, it cannot stop immediately when the client issues a "STOP_STREAM" message. More packages than needed might have been transmitted already and the client and server can synchronize this by employing the outlined messages.

Figure 6:
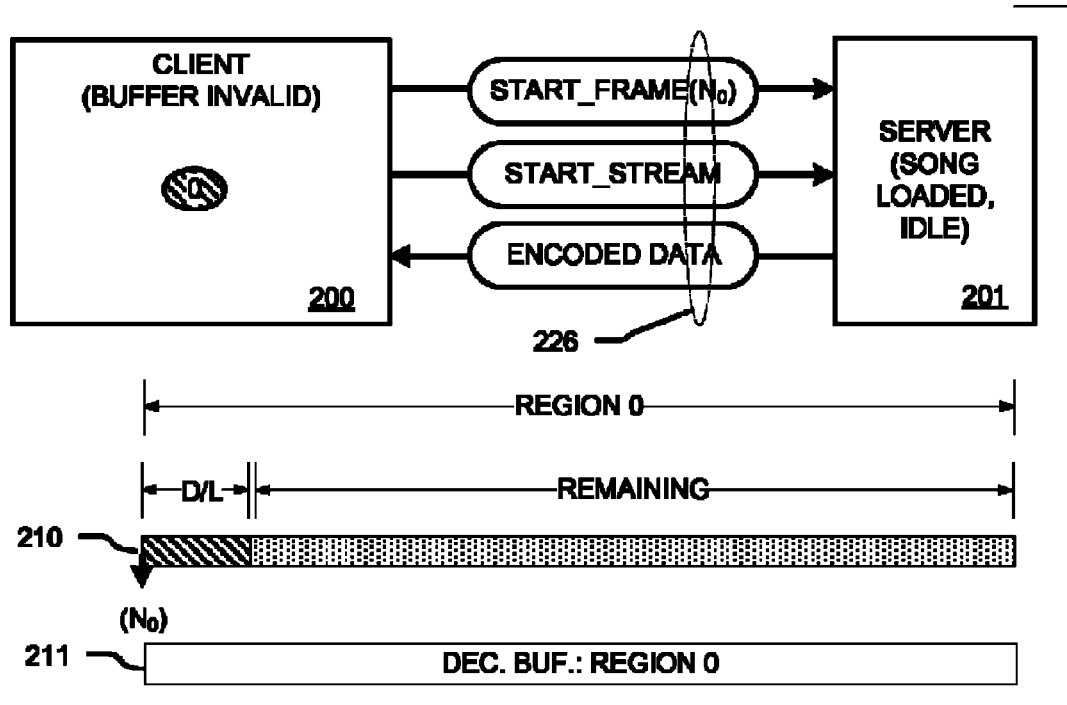
FIGS. 6-14 illustrate stages in an interactive process for downloading media data using the region management and buffer management techniques as described herein.

In FIG. 6, the server has a loaded song and is in an idle state. The client 200 is in a position of selecting audio data for downloading, and establishes a data structure having a single node 0 in an active download state. The client 200 and server 201 exchange flow control messages 226. The client 200 sends flow control messages to the server 201 including START_FRAME($N_0$) indicating a starting position $N_0$ as shown on the play head 210, and a START_STREAM message. The server 201 begins sending encoded data. The decoded data are loaded into a decode buffer 211 for region 0.

Figure 7:
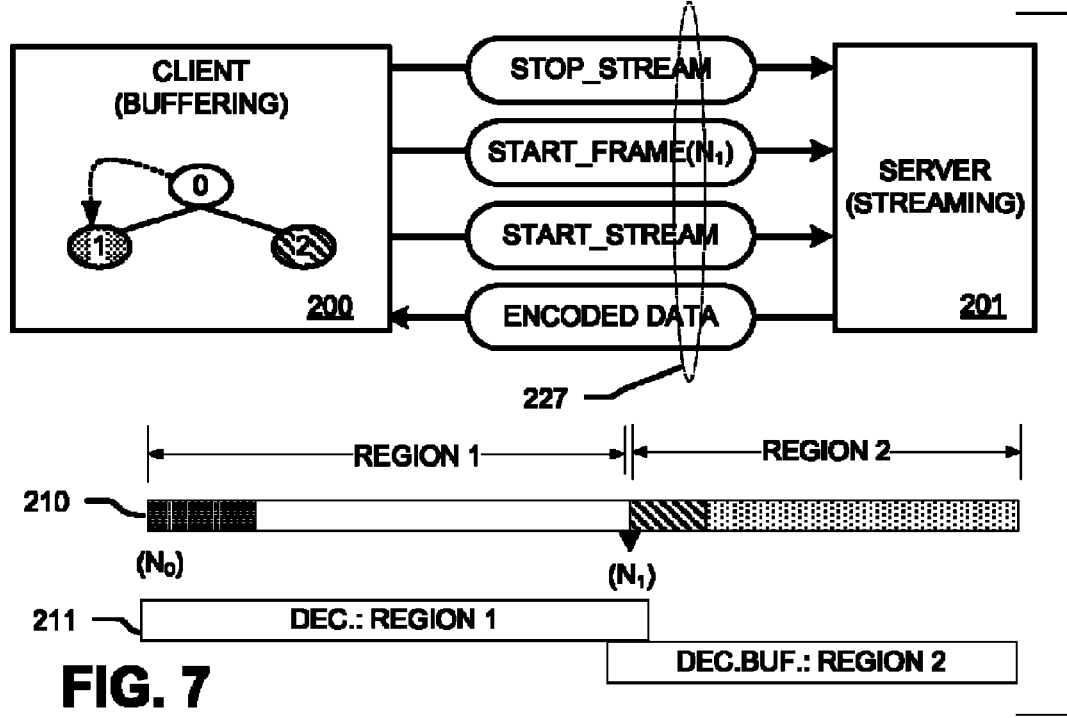

In a next stage as shown in FIG. 7, while the client is buffering and the server is streaming the encoded audio data, the user at the client selects a second play head position $N_1$, which results in a split of region 0 into regions 1 and 2, in this example with the region having some completed downloaded data going to the left in the binary tree. The flow control messages 227 exchanged include a stop_stream message, a START_FRAME($N_1$) message and a START_STREAM message from the client 200 to the server 201, and encoded data from the server 201 to the client 200 beginning at the new start position $N_1$. The new start position $N_1$ can be determined according to the particular encoding scheme being applied. For an MP3 scheme using "chunks" of 12 frames each, the new start position $N_1$ can be calculated by identifying the closest frame boundary in advance of a user selected start position, and then adding one "chunk" of 12 frames in advance of that closest frame boundary. In other embodiments, the new start position $N_1$ can be set to any number of frames in advance of the start position other than the number of frames per chunk. The added frame or frames in advance of the user selected start position can be used to provide a pre-pended stream of audio data which can be discarded, so that the user selected start position falls within the known good part of the decoded stream, and also to produce an overlap region that can be applied for merging the download regions in a manner that avoids or minimizes audible seams in the merged data. Other techniques for creating overlap regions can be used, including techniques that add extra frames or extra chunks to the end of streaming segments. FIG. 7 shows this overlap of regions in the decode buffer 211 in a heuristic manner. In one embodiment, as the data is decoded and stored in the decode buffer for the current region, a constant amount of data is discarded leaving a "known good part" in the buffer. For example, the constant amount of data can include 2 frames, or 2304 samples. For an embodiment that pre-pends a 12 frame chunk, this results in a 10 frame overlap region.

At the point that the flow control messages transition the flow to region 2 based on the new user selected start position, region 2 can be tagged in the data structure as the active download region, and the encoded data is loaded for region 2, and decoded data are loaded into a region 2 decode buffer 211.

The location at which the stream for region 0 was interrupted can be logged in the data structure as an interrupt start position in region 1, and can be used when the procedure returns to complete downloading of the skipped portions of the data. To support a case in which the initial start position is not the beginning of a media data, then the logic can be included that responds to the condition that the initial starting position is not the beginning of the media data, by splitting the media data into an initial region and an incomplete region.

The transition from streaming a segment of the data for region 0, into a segment for region 2 can involve procedures that deal with the asynchronous nature of the streaming and decoding process. For example, the Web Audio API decoder works asynchronously: it is fed with chunks of encoded data which it passes to a callback function once they are decoded. Flow control messages are not passed to the decoder, but are handled directly as a message that consists of a plain string, e.g. "stopped".

For example, assume the client has the following input via a WebSocket connection: . . . , Chunk, Chunk, Chunk, "DONE." In this situation the last three data chunks of a stream are fed to the decoder. The decoder asynchronously calls back for each decoded chunk which is then handled by a client side controller. The "DONE" message is directly handled by the controller without passing it to the decoder. Hence, it is quite likely that the "DONE" message is handled before the last data chunks are completely decoded. The message "DONE" means to the controller that the stream has finished, and so an index in the controller for the download head can be moved and a new stream started. To make sure that data in the decoding process is not lost, the flow control process can wait for the decoder. To achieve this, the controller can keep track of the number of chunks in the decoder by, for example, counting up for arriving encoded data chunks, and counting down for decoded data chunks passing the callback. So before "DONE" is actually handled the number of chunks in the decoder has to be 0.

Figure 8:
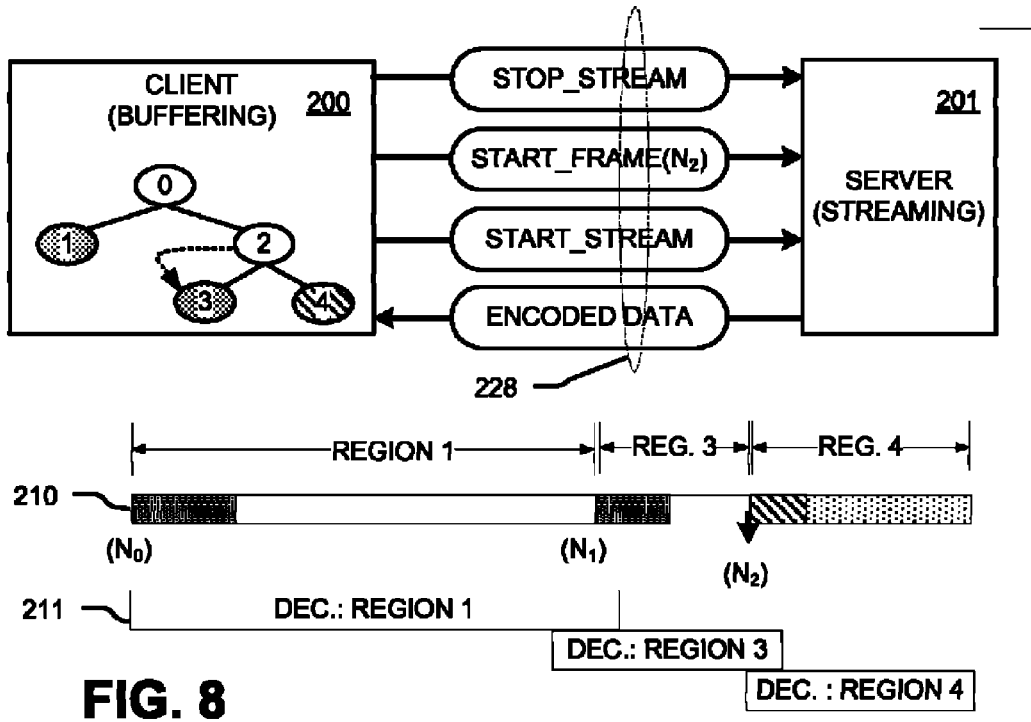

In a next stage, as shown in FIG. 8 the user selects yet another new play head position $N_2$. This results in a further split of region 2, into two new regions 3 and 4. The flow control messages 228 exchanged include a STOP_STREAM message, a START_FRAME($N_2$) message and a START_STREAM message from the client 200 to the server 201, and encoded data from the server 201 to the client 200 beginning at the new start position $N_2$. At this point, region 4 becomes the active download region, and the encoded data is loaded into region 4 of the play head 210, and decoded data are loaded into a region 4 decode buffer 211. The interrupt location from region 2 is logged for region 3.

Figure 9:
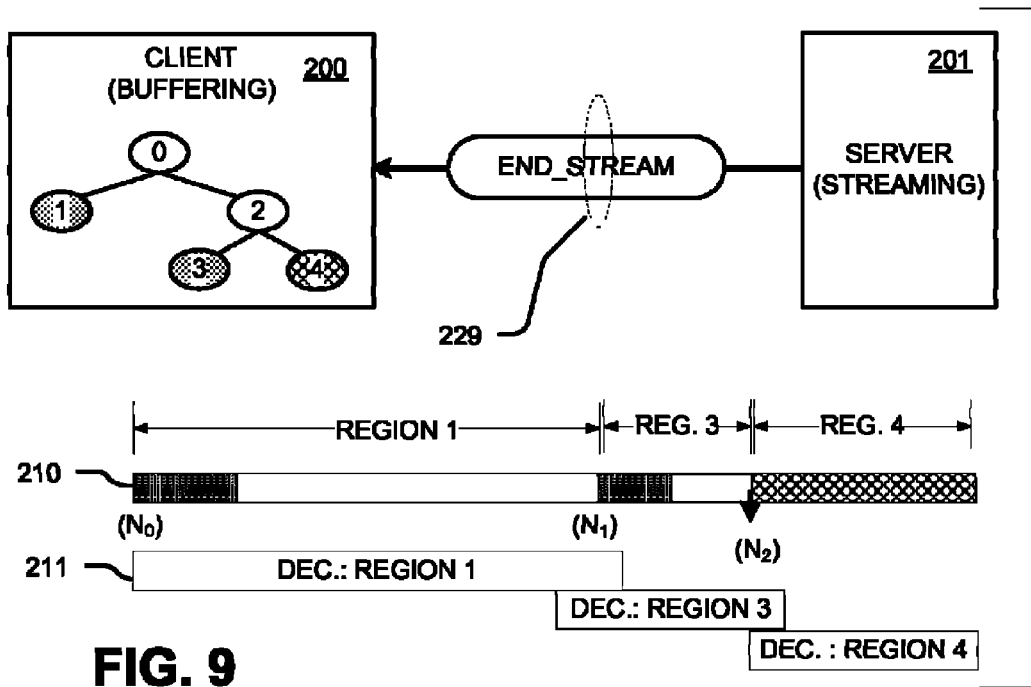

FIG. 9 illustrates a stage where the end of the audio data is reached by completing the download of Region 4. In this case, the server 201 which remains in the streaming state sends an END_STREAM flow control message 229 to the client 200. The leaf in the binary tree corresponding to region 4 on the data structure is marked as a completed region of the audio download. In response to this event (completion of the download of an end of the audio data), or otherwise following this event, such as after receiving the END_STREAM flow control message, the region management logic in the client walks the binary tree to find incomplete regions.

Figure 10:
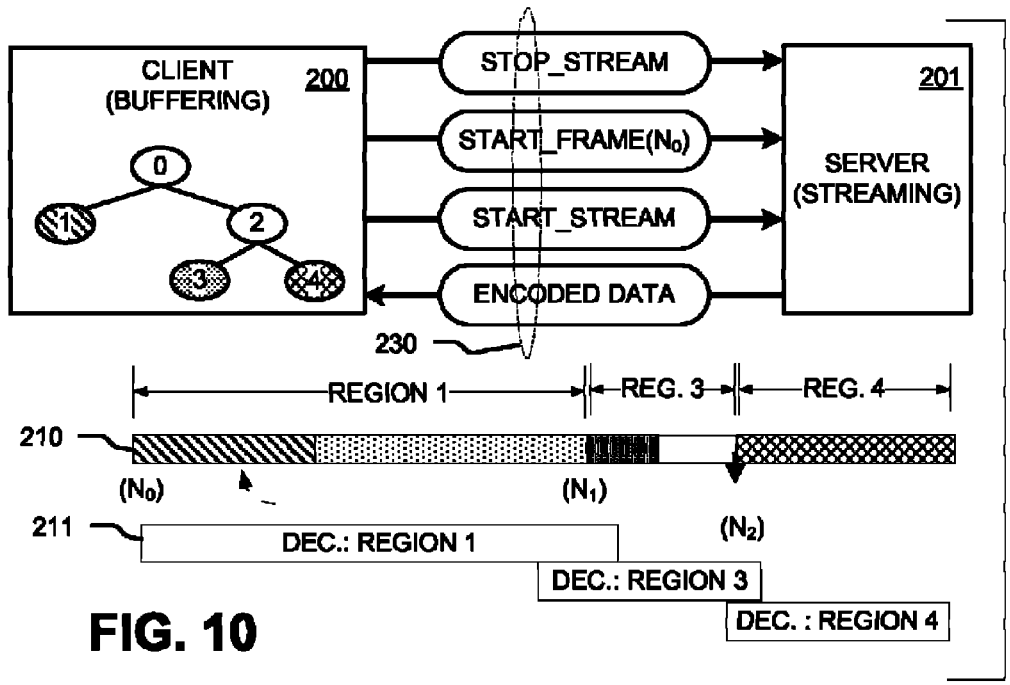

FIG. 10 illustrates a following stage, where the region management logic looks to the left side of the binary tree to find incomplete regions, traversing from left to right for example to complete the downloading (if no other play head set signal is received). As illustrated in FIG. 10, region 1 is the leftmost node on the binary tree, and the client sends a set of flow control messages 230 in this example including a STOP_STREAM message, a START_FRAME($N_0$) message and a START_STREAM message. The server responds by sending the encoded data. The process to complete region 1 can include starting over at the first start position $N_0$, or in alternative systems, the interrupt location maintained in Region 1 of the data structure is used by the start frame message for completion of Region 1. In yet other embodiments, region 1 can be split into two subregions, with the interrupt location used in place of a play head set signal to identify the beginning of the downloading for the incomplete part of region 1. The downloading of encoded data for region 1 continues until it is completed as illustrated in FIG. 11.

Figure 11:
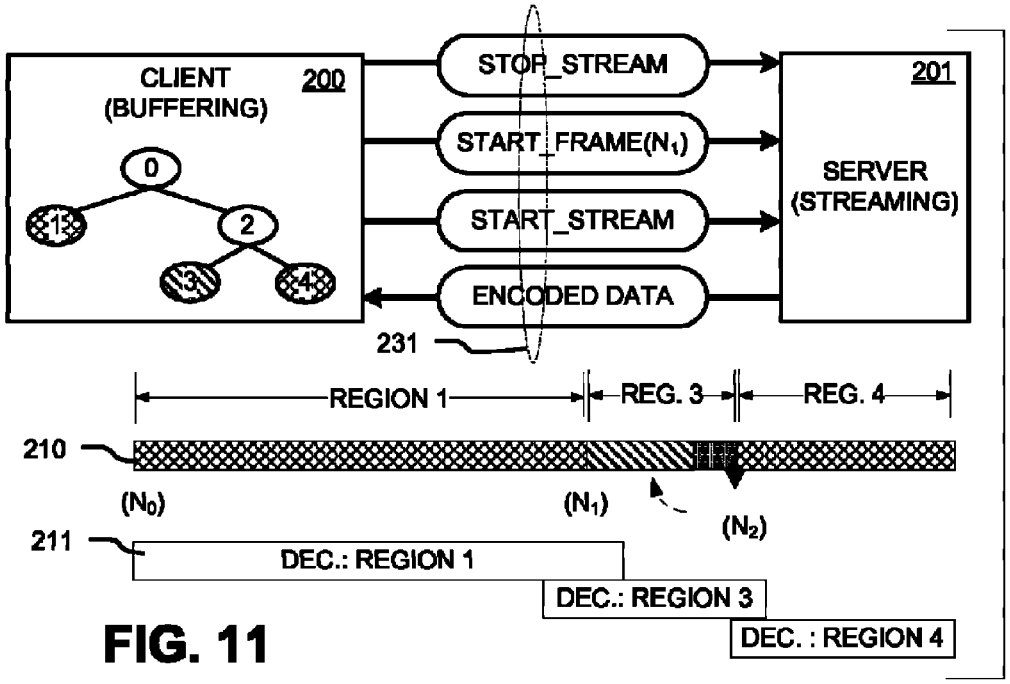

As shown in FIG. 11, traversing the binary tree from left to right, the region management logic selects region 3 as the active download region, and sends flow control messages 231 including a STOP_STREAM message, a START_FRAME ($N_3$) message and a START_STREAM message. The server responds by sending the encoded data. As with region 1, the START_FRAME message can select the interrupt location for region 3, in place of the original play head set position ($N_2$) to begin filling of the decode buffer for Region 2.

Figure 12:
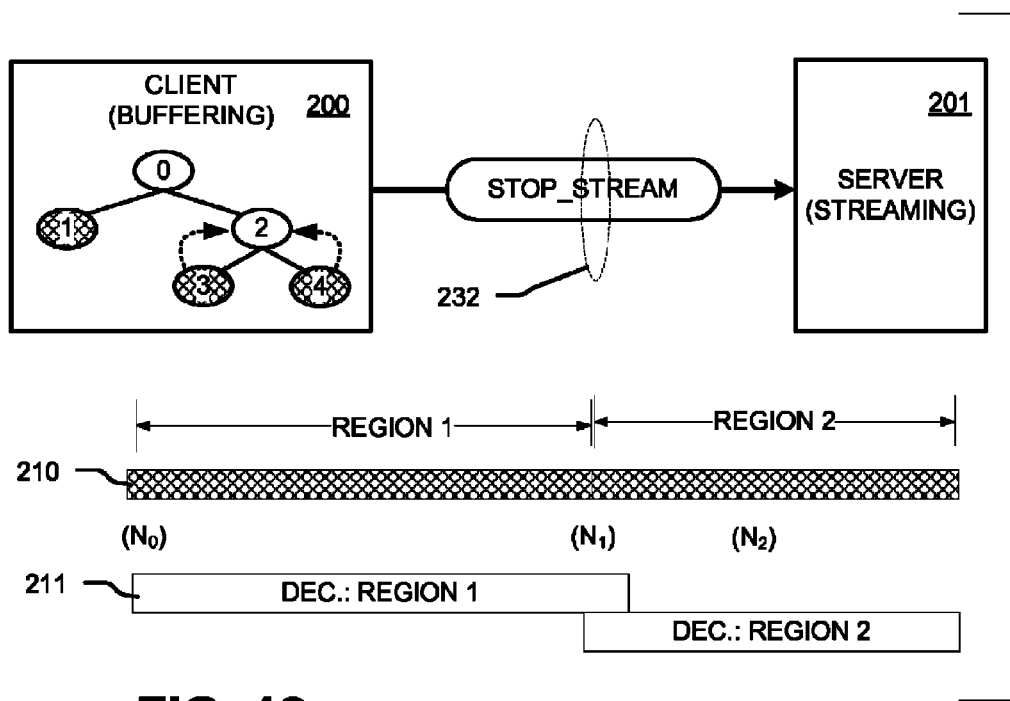

As illustrated in FIG. 12, on completion of the downloading for region 3, the client sends a STOP_STREAM flow control message 232 to the server, and the nodes 3 and 4 in the binary tree are merged back into their parent node 2. Likewise, the decode buffers for regions 3 and 4 are merged into a single decode buffer for region 2.

Figure 13:
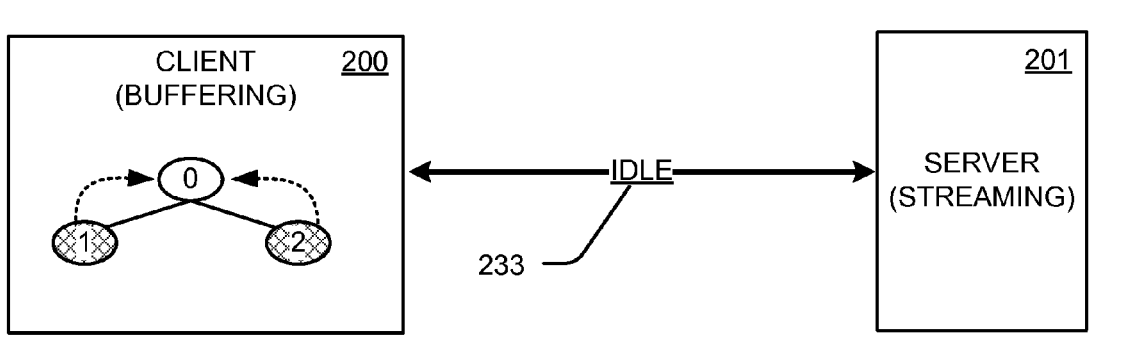
Figure 14:
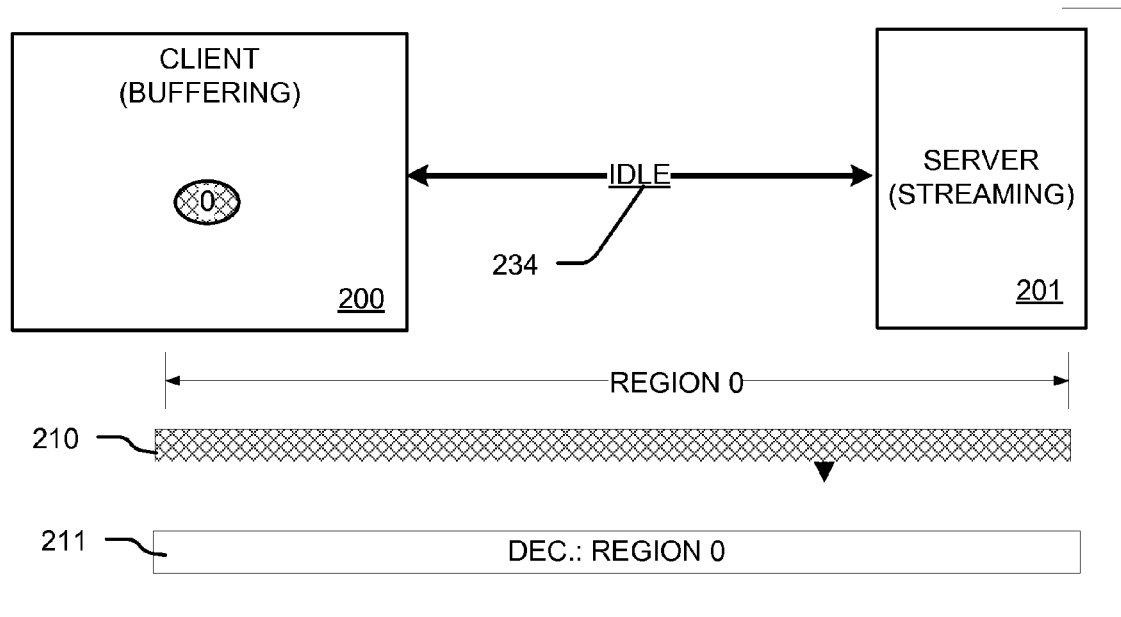

Next, as shown in FIG. 13, the region management logic merges the completed nodes 1 and 2 into their parent node 0, with the channel between the client 200 and the server 201 being idle 233. As shown in FIG. 14, the decode buffers for region 1 and region 2 are likewise merged into a single decode buffer for region 0 with the channel between the client 200 and the server 201 being idle 234.

So a basic process for downloading encoded media data for playback can be understood with reference to FIGS. 6 through 14.

If the media data are changed during the streaming process, then the data structure and the buffers for the data can be reset. After the reset has been done, the client decode buffer is empty. The client can then send START_FRAME and start messages to populate it with new data.

In one aspect, the process can be considered from the point of view of three flow control sequences. In this aspect, the process includes sending a first flow control message to a source of encoded media data requesting download of a first set of chunks of the encoded media data. The client receives and decodes the first set of chunks of the encoded media data to provide decoded data of a first portion of the media data, while buffering the decoded data of the first portion of the media data. If during this process, a signal indicating a new starting position is received, the download of the first set of chunks is interrupted and a second flow control message is sent to the source requesting download of a second set of chunks of the encoded media data based on the new starting position. The client receives and decodes the second set of chunks of the encoded media data to provide decoded data and buffers the decoded data for the second portion. After completion of the download of the second set of chunks, assuming no interruptions, a third flow control message is sent to the source requesting download of the data between the interruption position and the beginning of the second flow. This third flow control message can occur after several iterations of splitting and buffering the regions as discussed above as new play head set signals are received. The third flow control message results in downloading of the media data, which can be received and decoded at the client. The client buffers the decoded data to provide a third portion of the media data. The client merges the first, second and third portions of the media data to compile a complete set of the media data. A leading part of the data of at least the second portion, and preferably both the second portion and the third portion, of the decoded media data can be discarded so that only known good parts of the decoded audio data are merged to compile the completed set.

Figure 15:
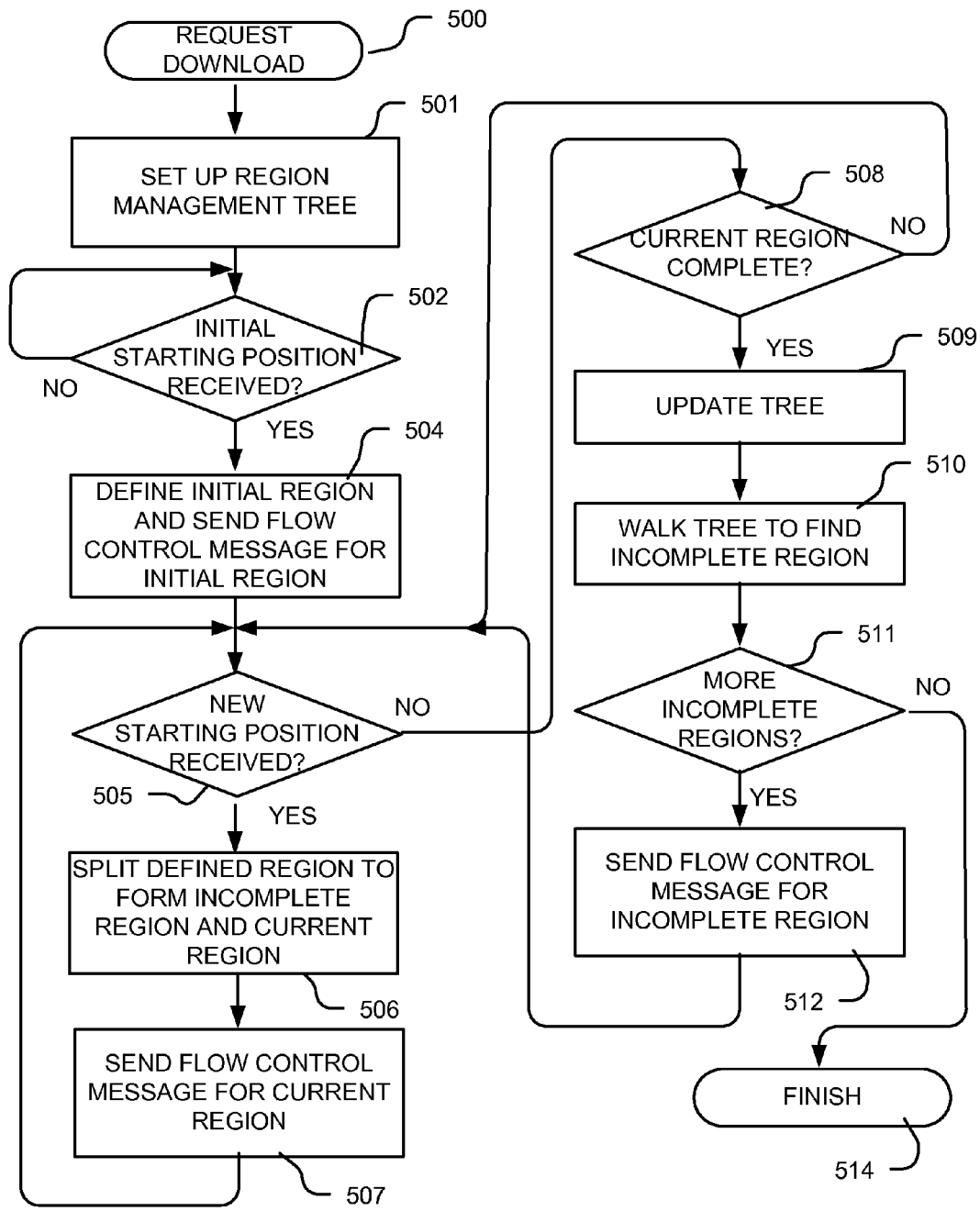
FIG. 15 is a flowchart illustrating the steps involved in media streaming like those illustrated with respect to FIGS. 6-14.

FIG. 15 is a flowchart summarizing an example of a process for implementing a buffering and region management process for an audio stream, like that described with reference to FIGS. 6 through 14. The process begins by requesting a download of audio data (500). The client side software, which can be delivered from the server as discussed above, or otherwise loaded into the client, sets up a region management tree (501). The client then waits for an initial starting position to be received from a user (502). Alternatively, the downloading can begin by default at the beginning of the audio stream. The region management logic defines an initial region and sends flow control messages to begin downloading encoded audio data for the initial region (504). In response to these flow control messages, the server sends chunks of the identified encoded media data to the client, where the chunks are decoded to form decoded media data, and stored in a decode buffer. Optionally, the client plays back the audio live during the download process.

During the downloading, the client monitors for the receipt of new starting positions (505). If a new starting position is received, then the defined region is split to form an incomplete region and the current region (506). Flow control messages are sent to the server to begin downloading the encoded audio data for the current region (507). The process then returns to block 505 to watch for new starting positions. If at block 505, it is determined that no new starting position has been received, then the algorithm determines whether the current region is complete (508). If the current region is not complete, the process returns to block 505 to look for a new starting position. If the current region is complete at block 508, then the binary tree is updated (509) while the buffers are merged. Then, the tree is walked to find other incomplete regions (510). If there are more incomplete regions as indicated block 511, then flow control messages are sent to recover the encoded data for the incomplete region (block 512). If at block 511, there are no more incomplete regions, then the region management logic finishes (514) while the buffers are merged to form the complete decoded audio data.

Figure 16:
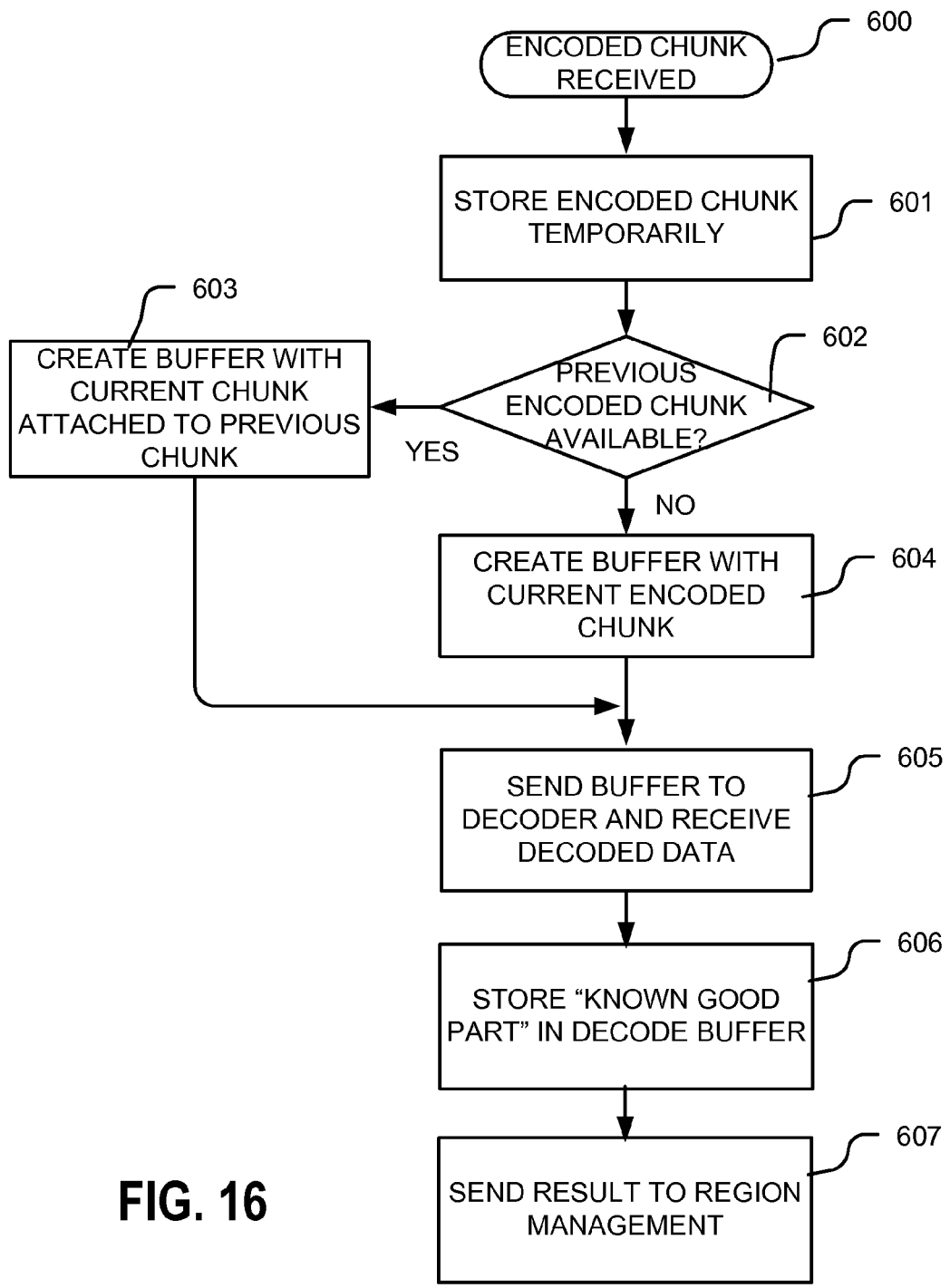
FIG. 16 is a flowchart of a buffering process which can be used to support interactive streaming as described herein.

FIG. 16 illustrates a basic process used by the client for creating decoded portions of the media data, that include known good parts which can be safely utilized, even with the discontinuous downloading procedures described herein. The process of FIG. 16 begins by receiving an encoded chunk 600, where a chunk can include a set of frames of an MP3 data. In one example system, a chunk can comprise 12 encoded MP3 frames. The client stores the encoded chunk temporarily (block 601). It then determines whether an encoded chunk from the same flow is available in a receive buffer (602). If a previous chunk buffer is available in a receive buffer, then the current chunk is attached to the previous chunk (603). If this is the first chunk in a flow, then a receive buffer is created for the current chunk (604). The set of chunks of encoded data streaming from the source can be buffered for decoding by the decoder at the client.

When there is sufficient data in a receive buffer to begin decoding, and the receive buffer holds data for the current play head position, or otherwise is ready for decoding, the encoded data are sent to a decoder, and decoded data are received in return (605). Each receive buffer can be handled in the sequence determined by the region management logic. The known good part of the decoded data is stored in a decode buffer for the region being downloaded (606). The result is then sent to the region management system (607), where the decode buffers can be used in the merger process.

Figure 17:
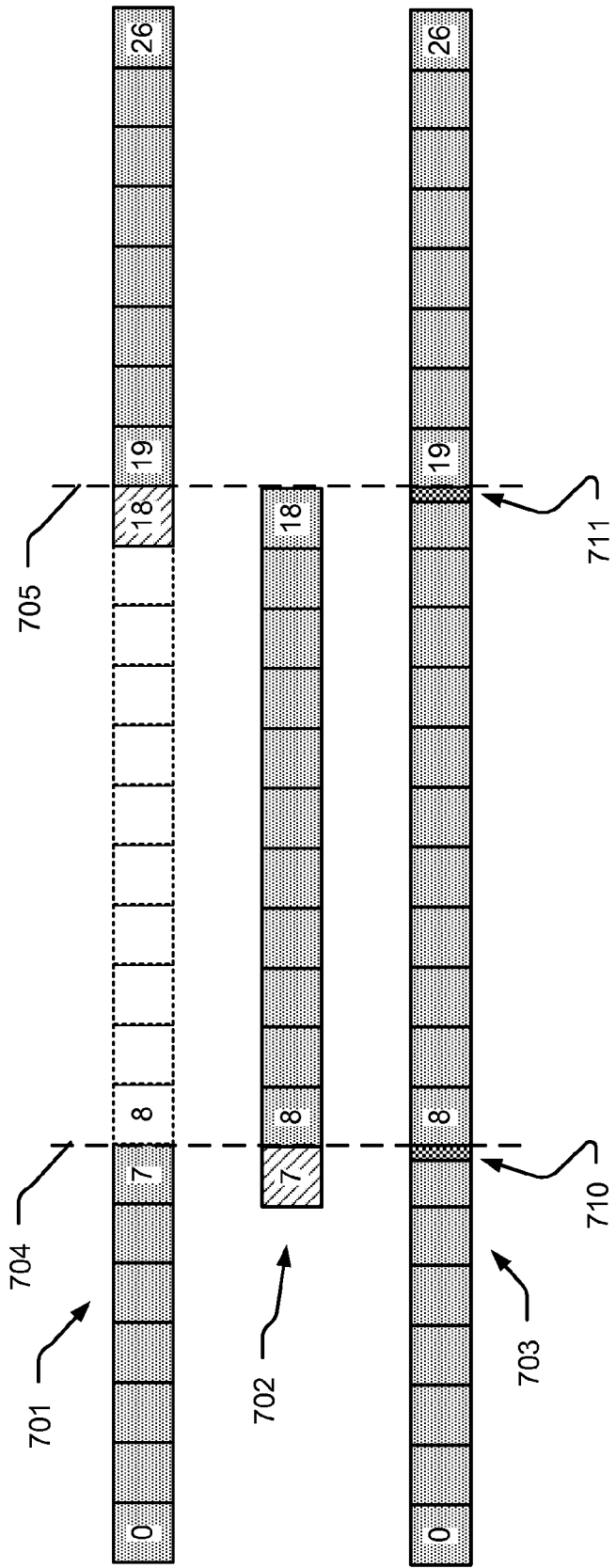
FIG. 17 is used illustrate buffer management and region management techniques according to embodiments of an interactive streaming process as described herein.

FIG. 17 is a schematic illustration of a three stages (701, 702, 703) of decoding of audio data including 26 chunks of 12 MP3 frames each in a downloading process, which is interrupted when the streaming has reached point 704 with a new play head set command at point 705. In this example, 8 chunks of encoded data are received beginning with the first chunk, chunk 0, and ending with chunk 7, and stored in a receive buffer, before a new play head set command is received identifying point 705. Thereafter, chunks 18 through 26 are received and stored in a second receive buffer.

In order to facilitate merger of the buffers using known good data, a segment of the audio data in advance of the point 705 is also downloaded. For example, chunk 18 is downloaded as the leading chunk in the sequence beginning at point 705. Upon receiving chunk 26 at the end of the stream, the region management logic returns to download the incomplete portion, beginning at the interrupt point 704 as illustrated by stage 702 in FIG. 17. The flow control messages begin downloading in advance of the sequence beginning at point 704 by downloading chunk 7, and continuing to chunk 18, and storing them in a third receive buffer. The decoding of the received chunks can be buffered to create overlapping regions of decoded audio data.

As mentioned above, a leading segment of the decoded data is discarded during merger of the decoded data for each set of chunks (e.g. each set assigned to a receive buffer) except for the first chunk (chunk 0 in a stream), preserving a known good part of the decoded data. The discard data are provided by decoded data from the last chunk of the previous set of chunks, and is thus known to be good.

In one example, using MP3 decoding, the known good part can be estimated by a static value, such as two 1152 sample frames. The decoded data for chunk 18 received during stage 701 are reduced on movement from the decode buffer to the merge buffer, therefore by the amount of samples that are discarded to preserve the known good part of the stream. So, the portion of chunk 18 from stage 701 saved in the second decode buffer of the streaming example in FIG. 17 will be reduced to 10 frames from 12 frames. Likewise, the decoded data for chunk 7 received during stage 702 saved in the third decode buffer are reduced therefore by the amount of samples that are discarded to preserve the known good part of the stream to 10 frames from 12 frames in the example.

In one example, merger of the decode buffers as illustrated in stage 703, part 710 of the overlapping data in the third decode buffer from the second instance of chunk 7 at the beginning of the segment received during stage 702, are combined with decoded data in the first decode buffer from the first instance of chunk 7 received during stage 701 at the end of the segment, such as by crossfading. The balance of the data in the third decode buffer from second instance of chunk 7 received during stage 702 can be discarded. Also, part 711 of the overlapping data in the second decode buffer from the first instance of chunk 18 during stage 701 at the beginning of the second segment, are combined with data from second instance of chunk 18 in the third decode buffer received at the end of the segment during stage 702. In an MP3 encoding example, the parts 710 and 711 can comprise just 2304 samples of the 11520, which produces about 50 milliseconds of audio, in one example which are crossfaded to match or mask the seams between the decoded regions. The size of the overlap parts 710 and 711 can vary according to other design choices, including for example choices to suit a particular combination of media data, encoding scheme and decoder, schemes used to merge the overlapping buffers, and the tastes of the designer.

The region boundaries are unlikely to fall on discrete "chunk" boundaries. Thus, the ends of the downloaded data can be trimmed by deleting data beyond the ending boundary of the region. In some embodiments, the samples at the ends of audio chunks beyond the region boundaries are not discarded until a following chunk is received, in case the end of the stream is reached.

Decoding 12 MP3 frames does not always result in 13824 (12*1152) samples. Sometimes the decoded data contains just 13823 samples. Therefore, a process of discarding a fixed number of samples at the lead of each set of chunks can result in odd sized chunks added to the buffer. However, it can be easier to handle the data (especially for calculations in the crossfade logic) if it is added in frame-discretized units—multiples of 1152.

So, in an alternative approach, in order to always get frame-discretized units of samples, the amount of skipped samples is dynamic. The amount to skip must be at least enough that the remaining samples can be considered a known good part, so for one MP3 example, at least one frame must be skipped to make sure to get rid of the decoding error at the beginning One approach to determining the number of samples to discard (or skip) can include simply determining the size of the decoded sample set, and applying a modulo (frame size) function. If the modulo function returns zero, then the sample set is frame-discrete already, and only one frame needs to be discarded. If the modulo function returns a non-zero value "ss," then the number of samples to be discarded is the sum of the value "ss" and the frame size. In this case, for an MP3 encoded example, the number of samples discarded at the leading edge of the region can vary between 1152 and 2304.

The amount of data produced on decoding the first chunk of a stream, in some MP3 decoder embodiments, is always 13,823 (one sample short of 12 frames). So the amount of samples skipped from the end of the decode buffer of the first chunk (chunk 0 of a data) can be always exactly 2,303. To obtain frame-discrete units in the merge buffer, and skip at least 1,152 samples, one can skip 2,303 samples from chunk 0. This results in 11,520 samples (10 frames) added to the merge buffer. When the second chunk is decoded, the start index in the merger logic can be set so that the skipped samples are recovered from the middle of the decoded data of two concatenated chunks in the decode buffer for the stream: the previous one and the current one. In one example process for an MP3 stream using 12 frame chunks, the first chunk is decoded, and adjusted to a frame-discrete size by discarding 2303 samples from the last two frames in the chunk and moving it to a merge buffer. The decoding of a second chunk in the receive buffer is set to decode starting at the beginning of the first chunk again for the purposes of aligning the data for the logic that merges the decode buffers. The data from the first 10 frames are not needed in this second pass, as they were produced from the decoding of the first chunk in the first pass, while the data of the last two frames of the first chunk are moved to the merge buffer, along with the first 10 frames from the second chunk. The last frame or frames of each chunk is/are held in the decode buffer until the following chunk is decoded, where they are available for use in the merger process in case it is the last chunk in the set. As each succeeding chunk is decoded, the data are moved to the merge buffer, while a trailing part is held until the next chunk is decoded, or until a signal is received indicating it is the last frame in the stream (e.g. a DONE signal from the source). If the end is reached, then the held trailing part is moved to the merge buffer.

Figure 18:
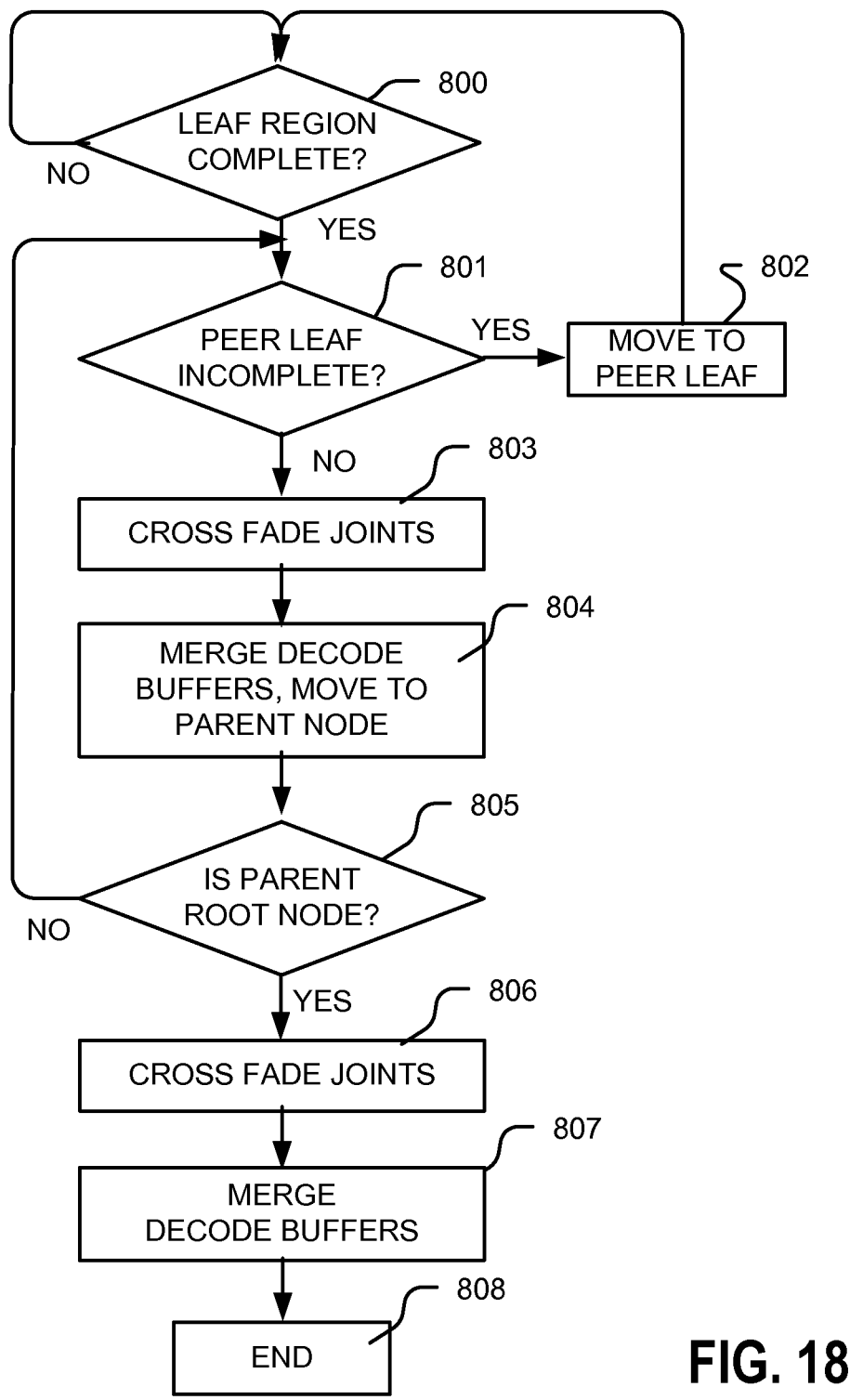
FIG. 18 is a flowchart of a process for merging decoded buffers of a media data, using a region management technique as described herein.

FIG. 18 is a flowchart illustrating merger of decode buffers in a region management system such as that described with reference to FIGS. 6 through 14. This algorithm waits to detect completion of the downloading of the encoded data for a leaf region in the binary tree (800). When the leaf region is completed, logic determines whether the peer leaf for that region is incomplete (801). If it is incomplete, then the download process moves to the peer leaf (802). In an alternative process as mentioned above, if the leaf region is completed, the logic traverses the tree from left to right to find incomplete leaves. If the peer leaf is not incomplete, the buffer management logic merges and crossfades the joints in the buffers for the peer leaves in the tree (803), merging the decode buffers (804) and moving to the parent node. If the parent node is the root of the tree (805), then the joints of the remaining buffers are crossfaded (806), and the decode buffers are merged (807) to form the completed decoded media data. At this point, this procedure ends (808). If at block 805 it is determined that the parent node was not the root node, the process returns to block 801 to find and process other incomplete leaves in the tree.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for perform processes described herein, systems including logic and resources to perform processes described herein, systems that take advantage of computer-assisted methods for performing processes described herein, media impressed with logic to perform processes described herein, data streams impressed with logic to perform processes described herein, or computer-accessible services that carry out computer-assisted methods for perform processes described herein. It is contemplated that modifications and combinations will readily occur to those skilled in the art, which modifications and combinations will be within the spirit of the invention and the scope of the following claims.

What is claimed is:

1. A method for downloading encoded media data for playback, comprising:

sending a first flow control message to a source of the encoded media data requesting download of a first set of chunks of the encoded media data;

receiving and decoding the first set of chunks of the encoded media data to provide decoded data of a first portion of the media data, and buffering decoded data of the first portion of the media data;

in response to receipt of a signal indicating a second starting position, interrupting the download of the first set of chunks, and sending a second flow control message to the source requesting download of a second set of chunks of the encoded media data based on the second starting position;

receiving and decoding the second set of chunks of the encoded media data to provide decoded data of a second portion of the media data, and buffering decoded data of the second portion of the media data;

after completion of the download of the second set of chunks, sending a third flow control message to the source requesting download of a remainder of the first set of chunks;

receiving and decoding the remainder of the first set of chunks of the encoded media data to provide decoded data of a third portion of the media data, and buffering decoded data of the third portion of the media data; and merging the first, second and third portions of the media data, including discarding a leading part of the second portion.

2. The method of claim 1, wherein merging the first, second and third portions of the media data includes discarding a leading part of the third portion.

3. The method of claim 1, including composing the second flow control message so that the second portion includes a leading segment in advance of the second starting position after said discarding a leading part, and wherein said merging the first, second and third portions includes combining the leading segment with a part of the first portion of the media data.

4. The method of claim 3, wherein said combining includes crossfading.

5. The method of claim 1, including:
  maintaining a data structure during download of the encoded media data which defines a region or regions in the media data;
  defining an initial region having an initial starting position, and sending said first flow control message;
  after receipt of said signal indicating the second starting position within the initial region in the data structure, splitting the initial region to define two regions, the two regions including an incomplete region and a current region for the second starting position, and sending said second flow control message; and
  walking the data structure to find an incomplete region, and sending said third flow control message to the source requesting download of chunks of the encoded media data to fill the incomplete region.

6. The method of claim 5, wherein said data structure comprises a binary tree.

7. The method of claim 5, including repeating said walking and sending flow control messages until there are no further incomplete regions.

8. The method of claim 5, including if the initial starting position is not the beginning of the media data, then splitting the media data into said initial region and an incomplete region.

9. The method of claim 1, wherein the encoded media data encodes frames of samples, and including trimming samples from decoded portions, so that the decoded portions have sizes that are integer multiples of a frame size.

10. The method of claim 1, wherein said second flow control message includes a request to download the encoded media data starting at a position that precedes the new starting position by a leading sequence of encoded data.

11. The method of claim 1, including logging an interruption position for the first portion, and wherein said third flow control message includes a request to download the encoded media data that precedes the interruption position by a leading sequence of encoded data.

12. The method of claim 1, including beginning playing data from the media data before download of the encoded media data is complete.

13. The method of claim 1, wherein the media data comprises audio data.

14. A method for delivering encoded media data for playback, comprising:
  transmitting an electronic document from a source processor on a data communications channel to a destination device, the electronic document including a script or a link to a script that includes instructions executable by a computer, the instructions including logic to:
    send a first flow control message to a source of the encoded media data requesting download of a first set of chunks of the encoded media data;
    receive and deliver to a decoder the first set of chunks of the encoded media data to provide decoded data of a first portion of the media data, and to buffer the first portion of the media data;
    in response to receipt of a signal indicating a second starting position, to interrupt the download of the first set of chunks, and send a second flow control message to the source requesting download of a second set of chunks of the encoded media data based on the second starting position;
    receive and deliver to a decoder the second set of chunks of the encoded media data to provide decoded data of a second portion of the media data, and to buffer the second portion of the media data;
    after completion of the download of the second set of chunks, send a third flow control message to the source requesting download of a third set of chunks for data between the first and second portions;
    receive and deliver to a decoder the third set of chunks of the encoded media data to provide decoded data of a third portion of the media data, and to buffer the third portion of the media data; and
    merge the first, second and third portions of the media data, including to discard a leading part of the second portion.

15. The method of claim 14, wherein the logic to merge the first, second and third portions of the media data discards a leading part of the third portion.

16. The method of claim 14, including logic to compose the second flow control message so that the second portion includes a leading segment in advance of the second starting position, and wherein said logic to merge the first, second and third portions combines the leading segment with a part of the third portion of the media data.

17. The method of claim 16, wherein logic to merge the first, second and third portions combines the leading segment with samples of the third portion by crossfading.

18. The method of claim 14, the electronic document including logic to:
  maintain a data structure during download of the encoded media data which defines a region or regions in the encoded media data;
  define an initial region having an initial starting position, and sending said first flow control message;
  after receipt of said signal indicating a second starting position within the initial region in the data structure, split the initial region to define two regions, the two regions including an incomplete region and a current region for the second starting position, and send said second flow control message; and
  walk the data structure to find an incomplete region, and send said third flow control message to the source requesting download of chunks of the encoded media data to fill the incomplete region.

19. The method of claim 18, wherein said data structure comprises a binary tree.

20. The method of claim 18, the electronic document including logic to repeat said walking and sending flow control messages until there are no further incomplete regions.

21. The method of claim 18, the electronic document including logic which, if the initial starting position is not the beginning of the media data, then defines said initial region and an incomplete region.

22. The method of claim 14, wherein the encoded media data encodes frames of samples, and the electronic document including logic to trim samples from decoded portions, so that the decoded portions have sizes that are integer multiples of a frame size.

23. The method of claim 14, wherein said second flow control message includes a request to download the encoded media data starting at a position that precedes the second starting position by a leading sequence of encoded data.

24. The method of claim 14, the electronic document including logic to log an interruption position for the first portion, and wherein said third flow control message includes a request to download the encoded media data that precedes the interruption position by a leading sequence of encoded data.

25. The method of claim 14, wherein the media data comprise audio data.

26. The method of claim 14, wherein said electronic document comprises computer executable markup language data.

27. An apparatus comprising:
a data processing system including a processor and memory, and encoded media data and an electronic document stored in the memory, the electronic document including a script or a link to a script that includes instructions executable by a computer, the instructions including logic to:
send a first flow control message to a source of the encoded media data requesting download of a first set of chunks of the encoded media data;
receive and deliver to a decoder, the first set of chunks of the encoded media data to provide decoded data of a first portion of the media data, and to buffer the first portion of the media data;
in response to receipt of a signal indicating a second starting position, to interrupt the download of the first set of chunks, and send a second flow control message to the source requesting download of a second set of chunks of the encoded media data based on the second starting position;
receive and deliver to a decoder, the second set of chunks of the encoded media data to provide decoded data of a second portion of the media data, and to buffer the second portion of the media data;
after completion of the download of the second set of chunks, send a third flow control message to the source requesting download of a third set of chunks for data between the first and second portions;
receive and deliver to a decoder, the third set of chunks of the encoded media data to provide decoded data of a third portion of the media data, and to buffer the third portion of the media data; and
merge the first, second and third portions of the media data, including to discard a leading part of the second portion.

28. The apparatus of claim 27, wherein the logic to merge the first, second and third portions of the media data discards a leading part of the third portion.

29. The apparatus of claim 27, including logic to compose the second flow control message so that the second portion includes a leading segment in advance of the second starting position, and wherein said logic to merge the first, second and third portions combines the leading segment with a part of the third portion of the media data.

30. The apparatus of claim 29, wherein logic to merge the first, second and third portions combines the leading segment with samples of the third portion by crossfading.

31. The apparatus of claim 27, the electronic document including logic to:
maintain a data structure during download of the encoded media data which defines a region or regions in the encoded media data;
define an initial region having an initial starting position, and sending said first flow control message;
after receipt of said signal indicating a second starting position within the initial region in the data structure, split the initial region to define two regions, the two regions including an incomplete region and a current region for the second starting position, and send said second flow control message; and
walk the data structure to find an incomplete region, and send said third flow control message to the source requesting download of chunks of the encoded media data to fill the incomplete region.

32. The apparatus of claim 31, wherein said data structure comprises a binary tree.

33. The apparatus of claim 31, the electronic document including logic to repeat said walking and sending flow control messages until there are no further incomplete regions.

34. The apparatus of claim 31, the electronic document including logic which, if the initial starting position is not the beginning of the media data, then defines said initial region and an incomplete region.

35. The apparatus of claim 27, wherein the encoded media data encodes frames of samples, and the electronic document including logic to trim samples from decoded portions, so that the decoded portions have sizes that are integer multiples of a frame size.

36. The apparatus of claim 27, wherein said second flow control message includes a request to download the encoded media data starting at a position that precedes the second starting position by a leading sequence of encoded data.

37. The apparatus of claim 27, the electronic document including logic to log an interruption position for the first portion, and wherein said third flow control message includes a request to download the encoded media data that precedes the interruption position by a leading sequence of encoded data.

38. The apparatus of claim 27, wherein the media data comprise audio data.

39. The apparatus of claim 27, wherein said electronic document comprises computer executable markup language data.

40. An apparatus comprising:
a memory including a non-transitory data storage medium, a script stored in the memory that includes instructions executable by a computer, the instructions including logic to:
send a first flow control message to a source of the encoded media data requesting download of a first set of chunks of the encoded media data;
receive and deliver to a decoder, the first set of chunks of the encoded media data to provide decoded data of a first portion of the media data, and to buffer the first portion of the media data;
in response to receipt of a signal indicating a second starting position, to interrupt the download of the first set of chunks, and send a second flow control message to the source requesting download of a second set of chunks of the encoded media data based on the second starting position;
receive and deliver to a decoder, the second set of chunks of the encoded media data to provide decoded data of a second portion of the media data, and to buffer the second portion of the media data;

after completion of the download of the second set of chunks, send a third flow control message to the source requesting download of a third set of chunks for data between the first and second portions;

receive and deliver to a decoder, the third set of chunks of the encoded media data to provide decoded data of a third portion of the media data, and to buffer the third portion of the media data; and merge the first, second and third portions of the media data, including to discard a leading part of the second portion.

41. The apparatus of claim 40, wherein the logic to merge the first, second and third portions of the media data discards a leading part of the third portion.

42. The apparatus of claim 40, including logic to compose the second flow control message so that the second portion includes a leading segment in advance of the second starting position, and wherein said logic to merge the first, second and third portions combines the leading segment with a part of the third portion of the media data.

43. The apparatus of claim 42, wherein logic to merge the first, second and third portions combines the leading segment with samples of the third portion by crossfading.

44. The apparatus of claim 40, the electronic document including logic to:
maintain a data structure during download of the encoded media data which defines a region or regions in the encoded media data;
define an initial region having an initial starting position, and sending said first flow control message;
after receipt of said signal indicating a second starting position within the initial region in the data structure, split the initial region to define two regions, the two regions including an incomplete region and a current region for the second starting position, and send said second flow control message; and
walk the data structure to find an incomplete region, and send said third flow control message to the source requesting download of chunks of the encoded media data to fill the incomplete region.

45. The apparatus of claim 44, wherein said data structure comprises a binary tree.

46. The apparatus of claim 44, the electronic document including logic to repeat said walking and sending flow control messages until there are no further incomplete regions.

47. The apparatus of claim 44, the electronic document including logic which, if the initial starting position is not the beginning of the media data, then defines said initial region and an incomplete region.

48. The apparatus of claim 40, wherein the encoded media data encode frames of samples, and the electronic document including logic to trim samples from decoded portions, so that the decoded portions have sizes that are integer multiples of a frame size.

49. The apparatus of claim 40, wherein said second flow control message includes a request to download the encoded media data starting at a position that precedes the second starting position by a leading sequence of encoded data.

50. The apparatus of claim 40, the electronic document including logic to log an interruption position for the first portion, and wherein said third flow control message includes a request to download the encoded media data that precedes the interruption position by a leading sequence of encoded data.

51. The apparatus of claim 40, wherein the media data comprise audio data.

52. The apparatus of claim 40, wherein said electronic document comprises computer executable markup language data.

53. A method for downloading encoded media data for playback, comprising:
maintaining a data structure during download of the encoded media data which defines a region or regions in the encoded media data;
after receipt of a signal indicating an initial starting position, defining an initial region for the initial starting position, and sending an initial flow control message to a source of the encoded media data requesting download of chunks of the encoded media data for the initial region;
after receipt of a signal indicating a second starting position within a region defined in the data structure, splitting the defined region based on the second starting position to define two regions, the two regions including an incomplete region and a current region for the second starting position, and sending a current-region flow control message to the source requesting download of chunks of the encoded media data for the current region; and
walking the data structure to find an incomplete region and, after requesting download for the current region, sending a region-fill flow control message to the source requesting download of chunks of the encoded media data to fill the incomplete region.

54. The method of claim 53, the instructions including logic to:
repeat sending region-fill flow control messages until there are no further incomplete regions.

55. A method for delivering encoded media data for playback; comprising:
transmitting an electronic document on a data communications channel to a requesting device, the electronic document including a script or a link to a script that includes instructions executable by a computer, the instructions including logic to:
maintain a data structure during download of the encoded media data which defines a region or regions in the encoded media data;
upon receipt of a signal indicating an initial starting position, define an initial region for the initial starting position, and send an initial flow control message to a source of the encoded media data requesting download of chunks of the encoded media data for the initial region;
upon receipt of a signal indicating a second starting position within a region defined in the data structure, split the defined region based on the second starting position to define two regions, the two regions including an incomplete region and a current region for the second starting position, and send a current-region flow control message to the source requesting download of chunks of the encoded media data for the current region; and
walk the data structure to find an incomplete region, after requesting download for the current region, and send a region-fill flow control message to the source requesting download of chunks of the encoded media data to fill the incomplete region.

56. The method of claim 55, the instructions including logic to:
repeat sending region-fill flow control messages until there are no further incomplete regions.

57. An apparatus comprising:
a data processing system including a processor and memory, and encoded media data and an electronic document stored in the memory, the electronic document including a script or a link to a script that includes instructions executable by a computer, the instructions including logic to:
maintain a data structure during download of the encoded media data which defines a region or regions in the encoded media data;
upon receipt of a signal indicating an initial starting position, define an initial region for the initial starting position, and send an initial flow control message to a source of the encoded media data requesting download of chunks of the encoded media data for the initial region;
upon receipt of a signal indicating a second starting position within a region defined in the data structure, split the defined region based on the second starting position to define two regions, the two regions including an incomplete region and a current region for the second starting position, and send a current-region flow control message to the source requesting download of chunks of the encoded media data for the current region; and
walk the data structure to find an incomplete region and, after requesting download for the current region, send a region-fill flow control message to the source requesting download of chunks of the encoded media data to fill the incomplete region.

58. The apparatus of claim 57, the instructions including logic to:
repeat sending region-fill flow control messages until there are no further incomplete regions.

59. An apparatus comprising:
a memory, including a non-transitory data storage medium,
a script stored in the memory that includes instructions executable by a computer, the instructions including logic to:
maintain a data structure during download of the encoded media data which defines a region or regions in the encoded media data;
upon receipt of a signal indicating an initial starting position, define an initial region for the initial starting position, and send an initial flow control message to a source of the encoded media data requesting download of chunks of the encoded media data for the initial region;
upon receipt of a signal indicating a second starting position within a region defined in the data structure, split the defined region based on the second starting position to define two regions, the two regions including an incomplete region and a current region for the second starting position, and send a current-region flow control message to the source requesting download of chunks of the encoded media data for the current region; and
walk the data structure to find an incomplete region, and after requesting download for the current region, and send a region-fill flow control message to the source requesting download of chunks of the encoded media data to fill the incomplete region.

60. The apparatus of claim 59, the instructions including logic to:
repeat sending region-fill flow control messages until there are no further incomplete regions.

* * * * *